US007680274B2

(12) United States Patent
Tompkin et al.

(10) Patent No.: US 7,680,274 B2
(45) Date of Patent: Mar. 16, 2010

(54) SECURITY ELEMENT COMPRISING MICRO- AND MACROSTRUCTURES

(75) Inventors: Wayne Robert Tompkin, Baden (CH); René Staub, Hagendorn (CH); Andreas Schilling, Hagendorn (CH)

(73) Assignee: OVD Kinegram AG, Zug (CH)

( * ) Notice: Subject to any disclaimer, the term of this patent is extended or adjusted under 35 U.S.C. 154(b) by 1532 days.

(21) Appl. No.: 10/510,395

(22) PCT Filed: Apr. 3, 2003

(86) PCT No.: PCT/EP03/03482

§ 371 (c)(1),
(2), (4) Date: Oct. 4, 2004

(87) PCT Pub. No.: WO03/084764

PCT Pub. Date: Oct. 16, 2003

(65) Prior Publication Data

US 2005/0082819 A1 Apr. 21, 2005

(30) Foreign Application Priority Data

Apr. 5, 2002 (DE) ................................ 102 16 562

(51) Int. Cl.
*G09C 3/00* (2006.01)
*G09C 5/00* (2006.01)

(52) U.S. Cl. ........................................................ 380/54

(58) Field of Classification Search ........................ None
See application file for complete search history.

(56) References Cited

U.S. PATENT DOCUMENTS 4,856,857 A 8/1989 Takeuchi et al.

(Continued)

FOREIGN PATENT DOCUMENTS

DE 2701176 12/1977

(Continued)

OTHER PUBLICATIONS

English translation of Japanese examination report issued May 13, 2008 from Japanese Patent Application No. 2003/581986 which application is a family member of the subject application.

*Primary Examiner*—Emmanuel L Moise
*Assistant Examiner*—Nadia Khoshnoodi
(74) *Attorney, Agent, or Firm*—Hoffmann & Baron, LLP

(57) ABSTRACT

A security element which is difficult to copy includes a layer composite which has microscopically fine, optically effective structures of a surface pattern, which are embedded between two layers of the layer composite. In a plane of the surface pattern, which is defined by co-ordinate axes x and y, the optically effective structures are shaped into an interface between the layers in surface portions of a holographically non-copyable security feature. In at least one surface portion the optically effective structure (9) is a diffraction structure formed by additive superimposition of a macroscopic superimposition function (M) with a microscopically fine relief profile (R). Both the relief profile (R), the superimposition function (M) and also the diffraction structure are functions of the co-ordinates x and y. The relief profile (R) is a light-diffractive or light-scattering optically effective structure and, following the superimposition function (M), retains the predetermined profile height. The superimposition function (M) is at least portion-wise steady and is not a periodic triangular or rectangular function. In comparison with the relief profile (R) the superimposition function (M) changes slowly. Upon tilting and rotation of the layer composite the observer sees on the illuminated surface portions light, continuously moving strips which are dependent on the viewing direction.

20 Claims, 4 Drawing Sheets

U.S. PATENT DOCUMENTS

| | | | | |
|---|---|---|---|---|
| 4,874,213 | A | 10/1989 | Cowan | |
| 4,984,824 | A * | 1/1991 | Antes et al. | 283/91 |
| 5,161,057 | A | 11/1992 | Johnson | |
| 5,949,578 | A | 9/1999 | Sermage | |
| 6,060,143 | A * | 5/2000 | Tompkin et al. | 428/64.1 |
| 6,130,777 | A | 10/2000 | Yamashita et al. | |
| 6,324,004 | B1 * | 11/2001 | Staub et al. | 359/567 |
| 7,054,042 | B2 * | 5/2006 | Holmes et al. | 359/2 |
| 7,311,043 | B2 * | 12/2007 | Mayer et al. | 101/150 |

FOREIGN PATENT DOCUMENTS

| | | | |
|---|---|---|---|
| DE | 100 28 426 | A1 | 4/2001 |
| EP | 0105099 | | 4/1984 |
| EP | 0360969 | | 4/1990 |
| EP | 0429782 | | 6/1991 |
| EP | 0 649 037 | A2 | 4/1995 |
| GB | 2 129 739 | A | 5/1984 |
| JP | 271178 | | 2/1952 |
| JP | 64-2000 | | 1/1989 |
| JP | 07239408 | | 9/1995 |
| JP | 95209 | | 1/1997 |
| WO | WO 88/05387 | | 7/1988 |
| WO | WO 98/26373 | | 6/1998 |
| WO | WO 99/38038 | | 7/1999 |
| WO | WO 01/80175 | A1 | 10/2001 |
| WO | WO0180175 | | 10/2001 |
| WO | WO 03/084766 | A3 | 10/2003 |

* cited by examiner

Fig. 4
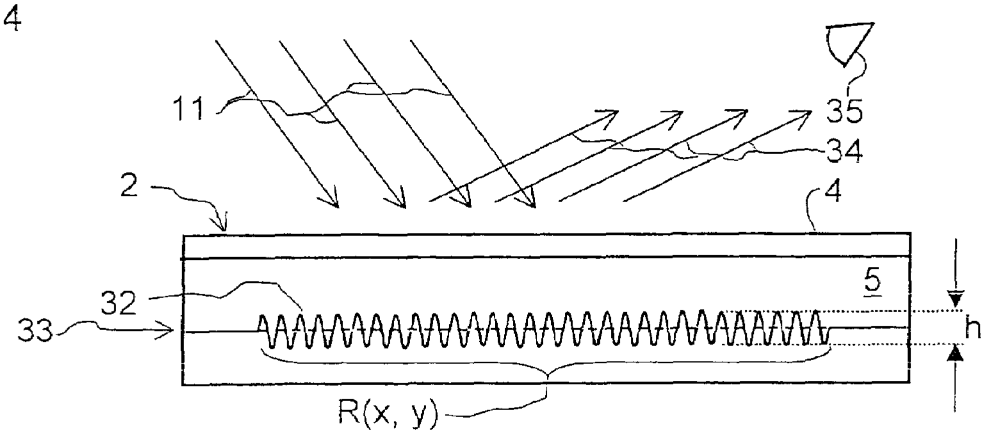
Fig. 5
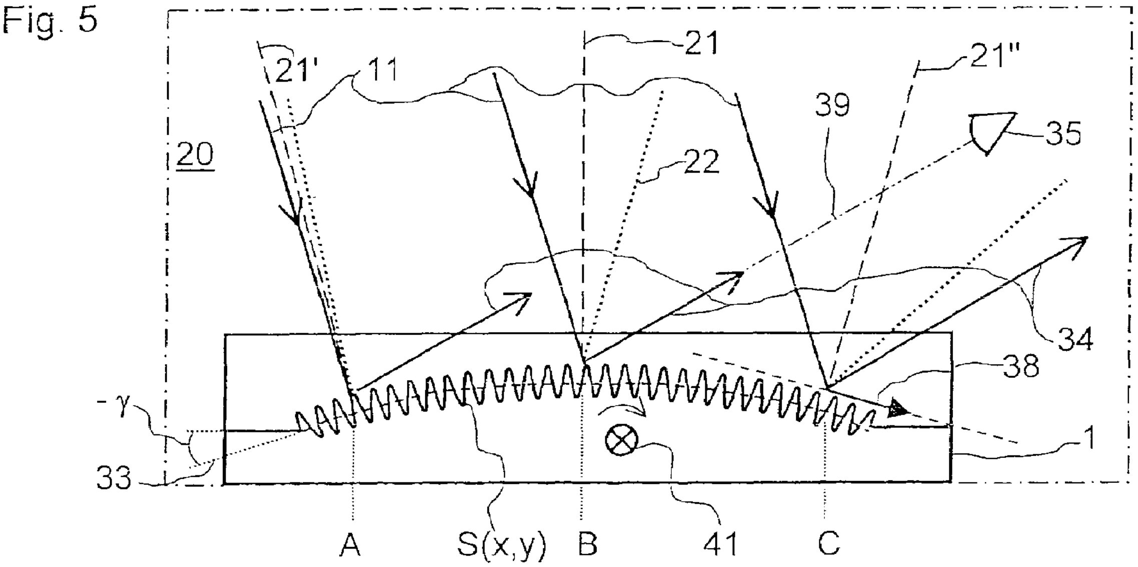
Fig. 6a
Fig. 6b
Fig. 6c
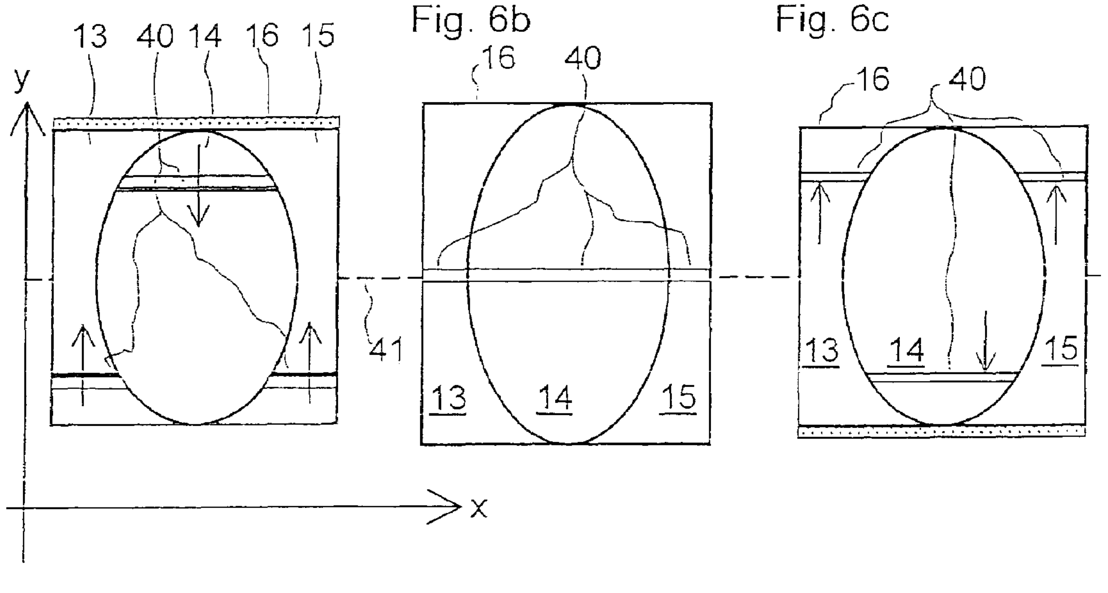

SECURITY ELEMENT COMPRISING MICRO- AND MACROSTRUCTURES

CROSS-REFERENCE TO RELATED APPLICATIONS

This application is a National Phase application of International Application No. PCT/EP2003/03482, filed on Apr. 3, 2003, which claims priority based on German Patent Application No. 102 16 562.9, filed on Apr 5, 2002, which are incorporated herein by reference.

BACKGROUND OF THE INVENTION

The invention relates to a security element.

Such security elements comprise a thin layer composite of plastic material, wherein at least relief structures from the group consisting of diffraction structures, light-scattering structures and flat mirror surfaces are embedded into the layer composite. The security elements which are cut out of the thin layer composite are stuck on to articles for verifying the authenticity of the articles.

The structure of the thin layer composite and the materials which can be used for same are described for example in U.S. Pat. No. 4,856,857. It is also known from GB 2 129 739 A for the thin layer composite to be applied to the article by means of a carrier film.

An arrangement of the kind set forth in the opening part of this specification is known from EP 0 429 782 B1. The security element which is stuck on to a document has an optically variable surface pattern which is known for example from EP 0 105 099 and which comprises surface portions arranged mosaic-like with known diffraction structures. So that a forged document, for faking apparent authenticity, cannot be provided without clear traces with a counterfeited security element which has been cut out of a genuine document or detached from a genuine document, security profiles are embossed into the security element and into adjoining portions of the document. The genuine document differs by virtue of the security profiles which extend seamlessly from the security element into adjoining portions of the document. The operation of embossing the security profiles interferes with recognition of the optically variable surface pattern. In particular the position of the embossing punch on the security element varies from one example of the document to another.

It is also known for the security elements to be provided with features which make it difficult or even impossible to counterfeit or copy using conventional holographic means. For example EP 0 360 969 A1 and WO 99/38038 describe arrangements of asymmetrical optical gratings. There, the surface elements have gratings which, used at different azimuth angles, form a pattern which is modulated in respect of brightness, in the surface pattern of the security element. The pattern which is modulated in respect of brightness is not reproduced in a holographic copy. If, as described in WO 98/26373, the structures of the gratings are smaller than the wavelength of the light used for the copying operation, such submicroscopic structures are no longer detected and are thus not reproduced in the copy in the same manner.

The protection arrangement to afford protection against holographic copying described in EP 0 360 969 A1, WO 98/26373 and WO 99/38038 which are referred to by way of example is achieved at the cost of difficulties in terms of production engineering.

SUMMARY OF THE INVENTION

The object of the invention is to provide an inexpensive novel security element which is to have a high level of resistance to attempts at forgery, for example by means of a holographic copying process.

That object is attained by a security element comprising a layer composite with microscopically fine optically effective structures of a surface pattern, which are embedded between layers of the layer composite, wherein the optically effective structures are shaped into a reflecting interface between the layers in surface portions of a security feature in a plane of the surface pattern defined by co-ordinate axes and at least one surface portion of dimensions greater than 0.4 mm has a diffraction structure formed by additive or subtractive superimposition of a superimposition function describing a macroscopic structure with a microscopically fine relief profile, wherein the superimposition function, the relief profile and the diffraction structure are a function of the co-ordinates and the relief profile describes a light-diffracting or light-scattering optically effective structure which following the superimposition function retains the predetermined relief profile and the at least portion-wise steady superimposition function is curved at least in partial regions, it is not a periodic triangular or rectangular function and it changes slowly in comparison with the relief profile.

Advantageous configurations of the invention are set forth in the appendant claims.

BRIEF DESCRIPTION OF THE DRAWINGS

Embodiments of the invention are described in greater detail hereinafter and illustrated in the drawing in which:

FIG. 4 shows illumination and observation of the security element,

FIG. 5 shows reflection and diffraction at a diffraction structure,

FIG. 6 shows the security feature at various tilt angles,

DESCRIPTION OF THE INVENTION

Figure 1:
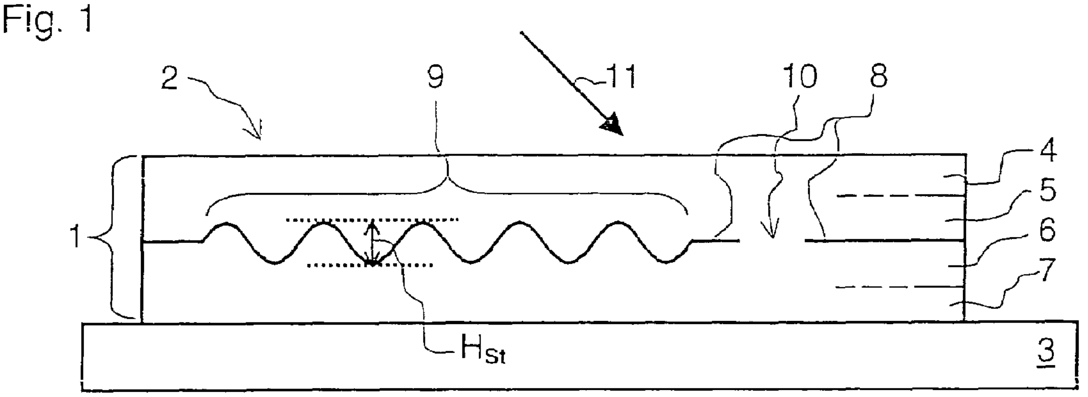
FIG. 1 is a cross-sectional view of a security element.

Referring to FIG. 1, reference 1 denotes a layer composite, 2 a security element, 3 a substrate, 4 a cover layer, 5 a shaping layer, 6 a protective layer, 7 an adhesive layer, 8 a reflecting interface, 9 an optically effective structure and 10 a transparent location in the reflecting interface 8. The layer composite 1 comprises a plurality of layer portions of various plastic layers which are applied successively to a carrier film (not shown here) and in the specified sequence typically comprises the cover layer 4, the shaping layer 5, the protective layer 6 and the adhesive layer 7. The cover layer 4 and the shaping layer 5 are transparent in relation to incident light 11. If the protective layer 6 and the adhesive layer 7 are also transparent, indicia (not shown here) which are applied to the surface of the substrate 3 can be perceived through the transparent location 10. In an embodiment the cover layer 4 itself serves as a carrier film while in another embodiment a carrier film serves for applying the thin layer composite 1 to the substrate 3 and is thereafter removed from the layer composite 1, as is described for example in above-mentioned GB 2 129 739 A.

The common contact surface between the shaping layer 5 and the protective layer 6 is the interface 8. The optically effective structures 9 are shaped into the shaping layer 5 with a structure height $H_{St}$ of an optically variable pattern. As the protective layer 6 fills the valleys of the optically effective structures 9, the interface 8 is of the same shape as the optically effective structures 9. In order to achieve a high level of effectiveness in respect of the optically effective structures 9 the interface 8 is provided with a metal coating, preferably comprising the elements from Table 5 of above-mentioned U.S. Pat. No. 4,856,857, in particular aluminum, silver, gold, copper, chromium, tantalum and so forth which as a reflection layer separates the shaping layer 5 and the protective layer 6. The electrical conductivity of the metal coating affords a high level of reflection capability in relation to visible incident light 11 at the interface 8. However, instead of the metal coating, one or more layers of one of the known transparent inorganic dielectrics which are listed for example in Tables 1 and 4 of above-mentioned U.S. Pat. No. 4,856,857 are also suitable, or the reflection layer has a multi-layer interference layer such as for example a double-layer metal-dielectric combination or a metal-dielectric-metal combination. In an embodiment the reflection layer is structured, that is to say it covers the interface 8 only partially and in predetermined zones of the interface 8.

The layer composite 1 is produced as a plastic laminate in the form of a long film web with a plurality of mutually juxtaposed copies of the optically variable pattern. The security elements 2 are for example cut out of the film web and joined to a substrate 3 by means of the adhesive layer 7. The substrate 3 which is mostly in the form of a document, a banknote, a bank card, a pass or identity card or another important or valuable article is provided with the security element 2 in order to verify the authenticity of the article.

Figure 2:
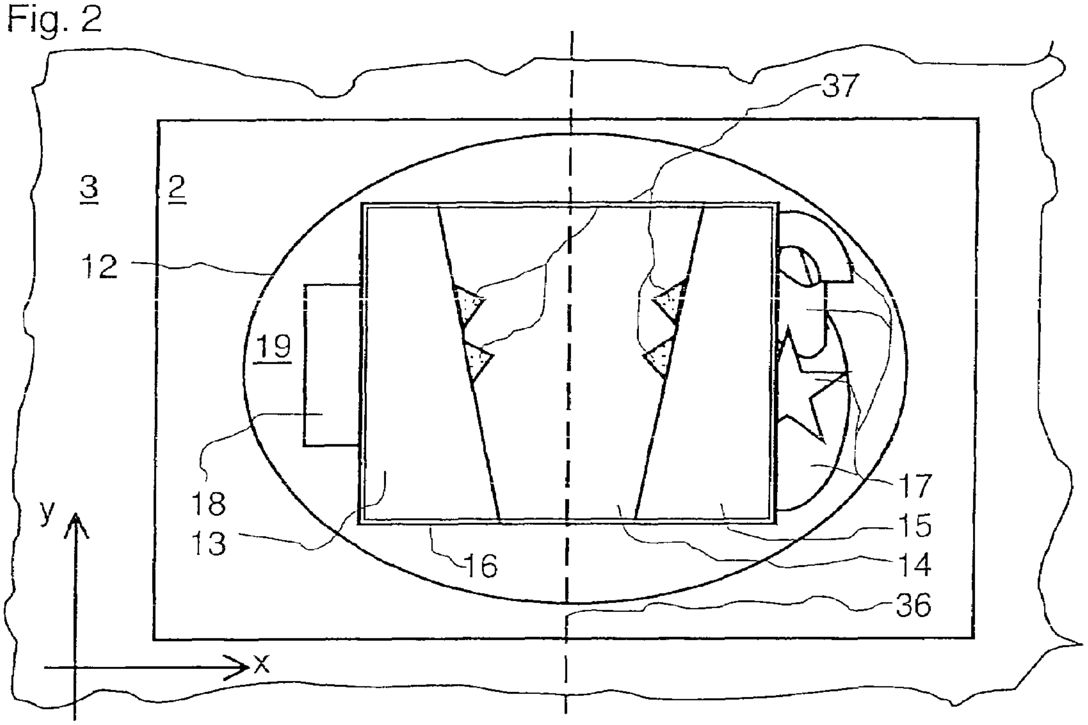
FIG. 2 shows a plan view of the security element.

FIG. 2 shows a portion of the substrate 3 with the security element 2. A surface pattern 12 is visible through the cover layer 4 (FIG. 1) and the shaping layer 5 (FIG. 1). The surface pattern 12 is disposed in a plane defined by the co-ordinate axes x, y and includes a security feature 16 comprising at least one surface portion 13, 14, 15 which is clearly visible in the contour thereof with the naked eye, that is to say the dimensions of the surface portion are greater than 0.4 mm at least in one direction. The security feature 16 is shown with double framing lines in FIG. 2, for reasons relating to the drawing. In another embodiment the security feature 16 is surrounded by a mosaic consisting of surface elements 17 through 19 of the mosaic described in above-mentioned EP 0 105 099 A1. In the surface portions 13 through 15 and optionally in the surface elements 17 through 19 the optically effective structures 9 (FIG. 1) such as microscopically fine diffractive gratings, microscopically fine, light-scattering relief structures or flat mirror surfaces are shaped into the interface 8 (FIG. 1).

Figure 3:
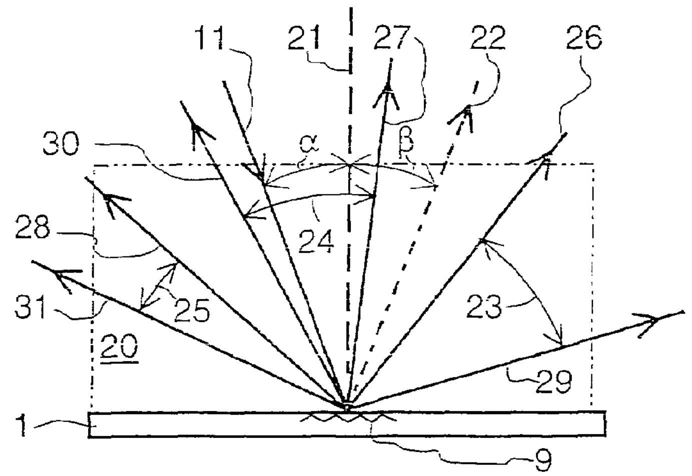
FIG. 3 shows reflection and diffraction at a grating.

Reference is made to FIG. 3 to describe how the light 11 which is incident on the interface 8 (FIG. 1) is reflected by the optically effective structure 9 and deflected in a predetermined manner. The incident light 11 is incident on the optically effective structure 9 in the layer composite 1 in the diffraction plane 20 which is perpendicular to the surface of the layer composite 1 with the security element 2 (FIG. 1) and which includes a surface normal 21. The incident light 11 is a parallel bundle of light beams and includes the angle of incidence α with the surface normal 21. If the optically effective structure 9 is a flat mirror surface in parallel relationship with the surface of the layer composite 1 the surface normal 21 and the direction of the reflected light 22 form the sides of the reflection angle β, wherein $\beta=-\alpha$. If the optically effective structure 9 is one of the known gratings, the grating deflects the incident light 11 into various diffraction orders 23 through 25 determined by the spatial frequency f of the grating, in which respect it is assumed that the grating vector describing the grating is in the diffraction plane 20. The wavelengths λ contained in the incident light 11 are deflected into the various diffraction orders 23 through 25 at the predetermined angles. For example the grating deflects violet light ($\lambda=380$ nm) simultaneously as beam 26 into the plus 1st diffraction order 23, as beam 27 into the minus 1st diffraction order 24 and as beam 28 into the minus 2nd diffraction order 25. Light components of longer wavelengths λ of the incident light 11 will issue in directions involving larger diffraction angles relative to the surface normal 21, for example red light ($\lambda=700$ nm) into the directions identified by the arrows 29, 30, 31. The polychromatic incident light 11, as a consequence of diffraction at the grating, is fanned out into the light beams of the various wavelengths λ of the incident light 11, that is to say the visible part of the spectrum extends in the range between the violet light beam (arrow 26 or 27 or 28 respectively) and the red light beam (arrow 29 or 30 or 31 respectively) in each diffraction order 23 or 24 or 25 respectively. The light diffracted into the zero diffraction order is the light 22 which is reflected at the reflection angle β.

FIG. 4 shows a diffraction grating 32 which is shaped in the surface elements 17 (FIG. 2) through 19 (FIG. 2) and whose microscopically fine relief profile R(x, y) has for example a sinusoidal, periodic profile cross-section of constant profile height h and with the spatial frequency f. The averaged-out relief of the diffraction grating 32 establishes a central plane or surface 33 which is arranged parallel to the cover layer 4. The light 11 which is incident in parallel relationship passes through the cover layer 4 and the shaping layer 5 and is deflected at the optically effective structure 9 (FIG. 1) of the diffraction grating 32. The parallel diffracted light beams 34 of the wavelength λ leave the security element 2 in the direction of view of an observer 35 who, when the surface pattern 12 (FIG. 2) is illuminated with the light 11 incident in parallel relationship, sees the colored surface elements 17, 18, 19 which shine brightly.

In FIG. 5 the diffraction plane 20 is in the plane of the drawing. A diffraction structure S(x, y) is shaped in at least one of the surface portions 13 (FIG. 2) through 15 (FIG. 2) of the security feature 16 (FIG. 2), the central surface 33 of the diffraction structure being curved or inclined locally relative to the surface of the layer composite 1. The diffraction structure S(x, y) is a function of the co-ordinates x and y in the plane of the surface pattern 12 (FIG. 2), which is parallel to the surface of the layer composite 1 and in which the surface portions 13, 14 (FIG. 2), 15 lie. At each point P(x, y) the diffraction structure S(x, y) determines a spacing z relative to the plane of the surface pattern 12, which spacing is in parallel relationship with the surface normal 21. Described in broader terms, the diffraction structure S(x, y) is the sum of the relief profile R(x, y) (FIG. 4) of the diffraction grating 32 (FIG. 4)

and a clearly defined superimposition function M(x, y) of the central surface 33, wherein S(x, y)=R(x, y)+M(x, y). By way of example the relief profile R(x, y) produces the periodic diffraction grating 32 with the profile of one of the known sinusoidal, asymmetrically or symmetrically sawtooth-shaped or rectangular forms.

In another embodiment the microscopically fine relief profile R(x, y) of the diffraction structure S(x, y) is a matt structure instead of the periodic diffraction grating 32. The matt structure is a microscopically fine, stochastic structure with a predetermined scattering characteristic for the incident light 11, wherein with an anisotropic matt structure instead of a grating vector, a preferred direction is involved. The matt structures scatter the perpendicularly incident light into a scattering cone with a spread angle which is predetermined by the scattering capability of the matt structure and with the direction of the reflected light 22 as the axis of the cone. The intensity of the scattered light is for example at the greatest on the axis of the cone and decreases with increasing distance in relation to the axis of the cone, in which respect the light which is deflected in the direction of the generatrices of the scattering cone is still just perceptible to an observer. The cross-section of the scattering cone perpendicularly to the axis of the cone is rotationally symmetrical, in the case of a matt structure which is referred to here as 'isotropic'. If in contrast the cross-section is upset in the preferred direction, that is to say elliptically deformed, with the short major axis of the ellipse in parallel relationship with the preferred direction, the matt structure is referred to here as being 'anisotropic'.

Because of the additive or subtractive superimposition the profile height h (FIG. 4) of the relief profile R(x, y) is not changed in the region of the superimposition function M(x, y), that is to say the relief profile R(x; y) follows the superimposition function M(x, y). The clearly defined superimposition function M(x, y) can be at least portion-wise differentiated and is curved at least in partial regions, that is to say $\Delta M(x, y) \neq 0$, periodically or aperiodically, and is not a periodic triangular or rectangular function. The periodic superimposition functions M(x, y) have a spatial frequency F of at most 20 lines/mm. For good visibility, connecting sections between two adjacent extreme values of the superimposition functions M(x, y) are at least 0.025 mm long. The preferred values for the spatial frequency F are limited to at most 10 lines/mm and the preferred values in respect of the spacing of adjacent extreme values are at least 0.05 mm. The superimposition function M(x, y) thus varies as a macroscopic function in the steady region slowly in comparison with the relief profile R(x, y).

A line 36 (FIG. 2) establishes a section line, projected on to the plane of the surface pattern 12 (FIG. 2), of the diffraction plane 20 with the central plane 33. The superimposition function M(x, y) has at any point P(x, y) on the connecting sections parallel to the line 36, with steady portions, a gradient 38, grad(M(x, y)). In general terms, the gradient 38 means the component of the grad(M(x, y)) in the diffraction plane 20 as the observer 35 establishes the optically effective diffraction plane 20. At any point of the surface portion 13, 14, 15 the diffraction grating 32 has an inclination γ which is predetermined by the gradient 38 of the superimposition function M(x, y).

The deformation of the central surface 33 causes a new, advantageous optical effect. That effect is explained on the basis of the diffraction characteristics at intersection points A, B, C of the surface normal 21 and normals 21', 21" to the central surface 33, for example along the line 36. Refraction of the incident light 11, the reflected light 22 and the diffracted light beams 34 at the interfaces of the layer composite 1 is not shown for the sake of simplicity in FIG. 5 and is not taken into account in the calculations hereinafter. At each intersection point A, B, C the inclination γ is determined by the gradient 38. The normals 21' and 21", the grating vector of the diffraction grating 32 (FIG. 4) and a viewing direction 39 of the observer 35 are disposed in the diffraction plane 20. The angle of incidence a (FIG. 3) which is included by the normals 21, 21', 21" shown in broken line and the white light 11 incident in parallel relationship changes in accordance with the angle of inclination y. There is also a change therewith in the wavelength λ of the diffracted light beams 34 which are deflected in a predetermined viewing direction 39 to the observer 35. If the normal 21' is inclined away from the viewer 35, the wavelength λ of the diffracted light beams 34 is greater than if the normal 21" is inclined towards the observer 35. In the example shown for illustration purposes, from the point of view of the observer 35, the light beams 34 which are diffracted in the region of the intersection point A are of a red color (λ=700 nm). The light beams 34 diffracted in the region of the intersection point B are of a yellow-green color (λ=550 nm) and the light beams 34 diffracted in the region of the intersection point C are of a blue color (λ=400 nm). As in the illustrated example the inclination γ changes continuously over the curvature of the central surface 33, the entire visible spectrum is visible for the observer 35 along the line 36 on the surface portion 13, 14, 15, the color bands of the spectrum extending on the surface portion 13, 14, 15 in perpendicular relationship to the line 36. So that the color bands of the spectrum can be perceived by the observer 35 at a 30 cm distance, at least 2 mm length or more is to be adopted for the distance between the intersection points A and C. Outside the visible spectrum, the surface of the surface portion 13, 14, 15 is a gray of low light intensity. When the layer composite 1 is tilted about the tilt axis 41 perpendicularly to the plane of the drawing in FIG. 5, the angle of incidence a changes. The visible color bands of the spectra are displaced in the region of the superimposition function M(x, y) continuously along the line 36. In the event of a tilting movement, for example in the clockwise direction about the tilt axis 41 of the layer composite 1, the color of the diffracted light beam 34 at the intersection point A changes to yellow-green, the color of the diffracted light beam 34 at the intersection point B changes to blue and the color of the diffracted light beam 34 at the intersection point C changes to violet. The variation in the colors of the diffracted light 34 is perceived by the observer 35 as motion of the color bands continuously over the surface portion 13, 14, 15.

That consideration is applicable in respect of each diffraction order. How many color bands of how many diffraction orders are simultaneously seen by the observer on the surface portion 13, 14, 15 depends on the spatial frequency of the diffraction grating 32 and the number of periods and the amplitude of the superimposition function M(x, y) within the surface portion 13, 14, 15.

In another embodiment in which one of the matt structures is used instead of the diffraction grating 32, the observer 35, in the direction of the reflected light 22, sees only a light, white-gray band instead of the color bands. In the tilting movement, the light, white-gray band moves continuously like the color bands over the surface of the surface portion 13, 14, 15. In contrast to the color bands the light, white-gray band is visible to the observer 35, in dependence on the scattering capability of the matt structure, even when his viewing direction 39 is oblique relative to the diffraction plane 20. Hereinafter therefore the term 'strips 40' (FIG. 6*a*)

is used to mean both the color bands of a diffraction order 23, 24, 25 and also the light, white-gray band produced by the matt structure.

Referring to FIG. 6*a*, the displacement of the strip can be more easily perceived by the observer 35 (FIG. 5) if there is a reference on the security feature 16. Serving as the reference are identification marks 37 (FIG. 2) arranged on the surface portion 13, 14, 15, for example, on the central surface portion 14, and/or a predetermined delimitation shape for the surface portion 13, 14, 15. Advantageously, the reference establishes a predetermined viewing condition which can be so adjusted by means of tilting movement of the layer composite 1 (FIG. 1) that the strip 40 is positioned in predetermined relationship with respect to the reference. In the region of the identification marks 37 the optically effective structure 9 (FIG. 1) of the interface 8 (FIG. 1) is advantageously in the form of an optically effective structure 9, a diffractive structure, a mirror surface or a light-scattering relief structure which is shaped upon replication of the surface pattern 12 in register relationship with the surface portions 13, 14, 15. Light-absorbent printing on the security feature 15 can however also be used as the reference for the movement of the strip 40 or the identification mark 37 is produced by means of the structured reflection layer.

In a further embodiment of the security feature 16 as shown in FIGS. 6 the adjacent surface portions 13 and 15 which adjoin the central surface portion 14 on both sides serve as a mutual reference. The adjacent surface portions 13 and 15 both have a diffraction structure S*(x, y). In contrast to the diffraction structure S(x, y) the diffraction structure S*(x, y) is the difference R–M of the relief function R(x, y) and the superimposition function M(x, y), that is to say S*(x, y)=R(x, y)–M(x, y). The color bands produced by the diffraction structure S*(x, y) are of a reversed color configuration with respect to the color bands of the diffraction structure S(x, y), as is indicated in the drawing of FIG. 6*a* by means of a bold longitudinal edging for the strip 40. For good visibility of the optical effect without aids, the security feature 16 is of a dimension of at least 5 mm and preferably more than 10 mm along the co-ordinate axis y or the line 36. The dimensions along the co-ordinate axis x are more than 0.25 mm, but preferably at least 1 mm.

In the embodiment of the security feature 16 shown in FIGS. 6*a* through 6*c* the oval surface portion 14 has the diffraction structure S(y) which is dependent only on the co-ordinate y while the surface portions 13 and 15 with the diffraction structure S*(y) which is dependent only on the co-ordinate y extend on both sides of the oval surface portion 14 along the co-ordinate y. The superimposition function is $M(y)=0.5\cdot y^2\cdot K$, wherein K is the curvature of the central surface 33. The gradient 38 (FIG. 5) and the grating vector of the diffraction grating 32 (FIG. 4) or the preferred direction of the 'anisotropic' matt structure are oriented in substantially parallel and anti-parallel relationship respectively with the direction of the co-ordinate y.

In general terms the azimuth $\phi$ of the grating vector or the preferred direction of the matt structure is related to a gradient plane which is determined by the gradient 38 and the surface normal 21. The preferred values of the azimuth $\phi$ are 0° and 90°. In that respect, deviations in the azimuth angle of the grating vector or of the preferred direction respectively of $\delta\phi=\pm 20°$ relative to the preferred value are admissible in order in that region to view the grating vector or the preferred direction respectively as substantially parallel or perpendicular respectively to the gradient plane. In itself the azimuth $\phi$ is not restricted to the specified preferred values.

The smaller the curvature K in each case is, the correspondingly higher is the speed of the movement of the strips 40 in the direction of the arrows (not referenced in FIGS. 6*a* and 6*c*) per unit of angle of the rotational movement about the tilt axis 41. The strip 40 is shown as being narrow in FIGS. 6*a* through 6*c* in order clearly to illustrate the movement effect. The width of the strips 40 in the direction of the arrows which are not referenced is dependent on the diffraction structure S(y). Particularly in the case of the color bands, the spectral color configuration extends over a major part of the surface portion 13, 14, 15 so that the movement of the strips 40 is to be observed on the basis of travel of a portion in the visible spectrum, for example the color band red.

FIG. 6*b* shows the security feature 16 after rotation about the tilt axis 41 into a predetermined tilt angle at which the strips 40 of the two outer surface portions 13, 15 and the central surface portion 14 are disposed on a line in parallel relationship to the tilt axis 41. That predetermined tilt angle is determined by the choice of the superimposition function M(x, y). In an embodiment of the security element 2 (FIG. 2) a predetermined pattern is to be seen on the surface pattern 12 (FIG. 2) only when in the security feature 16 the strip or strips 40 assume a predetermined position, that is to say when the observer 35 views the security element 2 under the viewing conditions determined by the predetermined tilt angle.

In FIG. 6*c*, after a further rotary movement about the tilt axis 41, the strips 40 on the security feature 16 are moved away from each other again, as is indicated by the arrows (not referenced) in FIG. 6*c*.

It will be appreciated that, in another embodiment, an adjacent arrangement of the central surface portion 14 and one of the two surface portions 13 and 15 is sufficient for the security feature 16.

Figure 7:
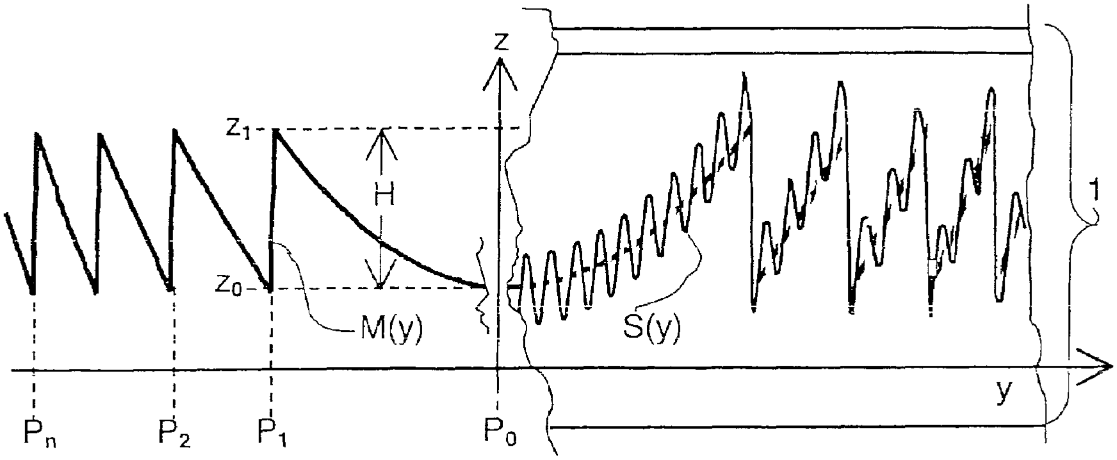
FIG. 7 shows a superimposition function and the diffraction structure in cross-section.

FIG. 7 shows a cross-section taken along the line 36 (FIG. 2) through the layer composite 1, for example in the region of the surface portion 14 (FIG. 2). So that the layer composite 1 does not become too thick and thus difficult to produce or use, the structure height $H_{St}$ (FIG. 1) of the diffraction structure S(x; y) is restricted. The drawing which is not true to scale in FIG. 7 illustrates by way of example the superimposition function $M(y)=0.5\cdot y^2\cdot K$ to the left of the co-ordinate axis z on which the height of the layer composite expands, in section on its own. At any point P(x, y) of the surface portion 14 the value z=M(x, y) is limited to a predetermined variation value $H=z_1-z_0$. As soon as the superimposition function M(y) has reached the value $z_1=M(Pj)$ for j=1, 2, . . . , n at one of the points $P_1$, $P_2$ . . . , $P_n$, a discontinuity location occurs in the superimposition function M(y), and at that discontinuity location, on the side remote from the point $P_0$, the value of the superimposition function M(y) is respectively reduced by the value H to the height $z_0$, that is to say the value of the superimposition function M(x; y) used in the diffraction structure S(x; y) is the function value:

$$z=\{M(x;y)+C(x;y)\} \text{ modulo value } H-C(x;y).$$

In that respect the function C(x; y) is limited in amount to a range of values, for example to half the value of the structure height $H_{St}$. The dislocation locations of the function {M(x; y)+C(x; y)} modulo value H–C(x; y), which are produced for technical reasons, are not to be counted as extreme values in respect of the superimposition function M(x; y). Equally, in given configurations, the values in respect of H may be locally smaller. In an embodiment of the diffraction structure S(x; y) the locally varying value H is determined by virtue of the fact that the spacing between two successive discontinuity locations $P_n$ does not exceed a predetermined value from the range of between 40 μm and 300 μm.

In the surface portions 13 (FIG. 2), 14, 15 (FIG. 2) the diffraction structure S(x, y) extends on both sides of the co-ordinate axis z and not just, as is shown in FIG. 7, on the right of the co-ordinate axis z. Because of the superimposition effect the structure height $H_{St}$ is the sum of the value H and the profile height h (FIG. 4) and equal to the value of the diffraction structure S(x, y) at the point P(x; y). The structure height $H_{St}$ is advantageously less than 40 μm, preferred values in respect of the structure height $H_{St}$ being <5 μm. The value H of the superimposition function M(x, y) is restricted to less than 30 μm and is preferably in the range of between H=0.5 μm and H=4 μm. On the microscopic scale the matt structures have fine relief structural elements which determine the scattering capability and which can only be described with statistical parameters, such as for example mean roughness value $R_a$, correlation length $I_c$, and so forth, in which respect the values in respect of the mean roughness value $R_a$ are in the range of between 200 nm and 5 μm, with preferred values between $R_a$=150 nm and $R_a$=1.5 μm, while the correlation lengths $I_c$, at least in one direction, are in the range of between 300 nm and 300 μm, preferably between $I_c$=500 nm and $I_c$=100 μm. In the case of the 'isotropic' matt structures the statistical parameters are independent of a preferred direction while in the case of the 'anisotropic' matt structures relief elements are oriented with the correlation length $I_c$ perpendicularly to the preferred direction. The profile height h of the diffraction grating 32 (FIG. 4) is of a value from the range of between h=0.05 μm and h=5 μm, wherein the preferred values are in the narrower range of h=0.6±0.5 μm. The spatial frequency f of the diffraction grating 32 is selected from the range of between f=300 lines/mm and 3300 lines/mm. From about F=2400 lines/mm the diffracted light 34 (FIG. 5) can still be observed only in the zero diffraction order, that is to say in the direction of the reflected light 22 (FIG. 5).

Further examples of the superimposition function M(x, y) are as follows:

$M(x, y)=0.5\cdot(x^2+y^2)\cdot K$, $M(x, y)=a\cdot\{1+\sin(2\pi F_x\cdot x)\cdot\sin(2\pi F_y\cdot y)\}$, $M(x, y)=a\cdot x^{1.5}+b\cdot x$, $M(x, y)=a\cdot\{1+\sin(2\pi F_y\cdot y)\}$, wherein $F_x$ and $F_y$ are respectively the spatial frequency F of the superimposition function M(x, y) in the direction of the co-ordinate axis x and y respectively. In another embodiment of the security feature 16 the superimposition function M(x, y) is composed periodically from a predetermined portion of another function and has one or more periods along the line 36.

Figure 8A:
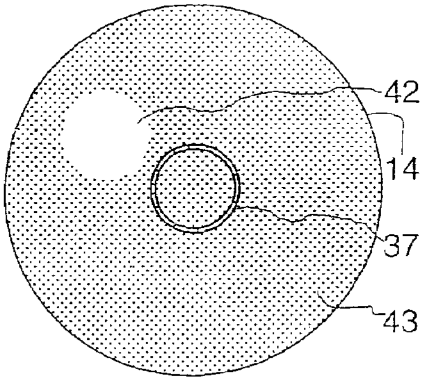
FIG. 8 shows orientation of the security element by means of identification marks.
Figure 8B:
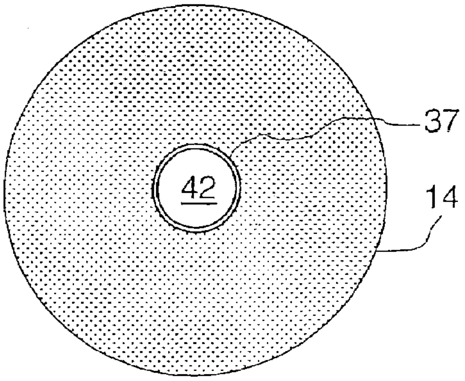

In FIG. 8*a* the superimposition function $M(x, y)=0.5\cdot(x^2+y^2)\cdot K$, that is to say a portion of a sphere, and the relief structure R(x, y), that is to say an 'isotropic' matt structure, form the diffraction structure S(x, y) (FIG. 7) in the surface portion 14 which for example has a circular edging. The observer 35 (FIG. 5), in daylight, in accordance with the viewing direction 39 (FIG. 5), sees a light, white-gray spot 42 against a dark-gray background 43, the position of the spot 42 in the surface portion 14 in relation to the identification mark 37 and the contrast between the spot 42 and the background 43 being dependent on the viewing direction 39. The extent of the spot 42 is determined by the scattering capability of the matt structure and the curvature of the superimposition function M(x, y). The security element 2 (FIG. 2) is to be oriented to the predetermined viewing direction 39 for example by tilting about the tilt axis (41 (FIG. 5) and/or rotation about the surface normal 21 (FIG. 5) of the layer composite 1 (FIG. 5) as in FIG. 8*b* in such a way that the spot 42 is within the identification mark 37 which is arranged for example at the center of the surface portion 14 with a circular edging.

Figure 9:
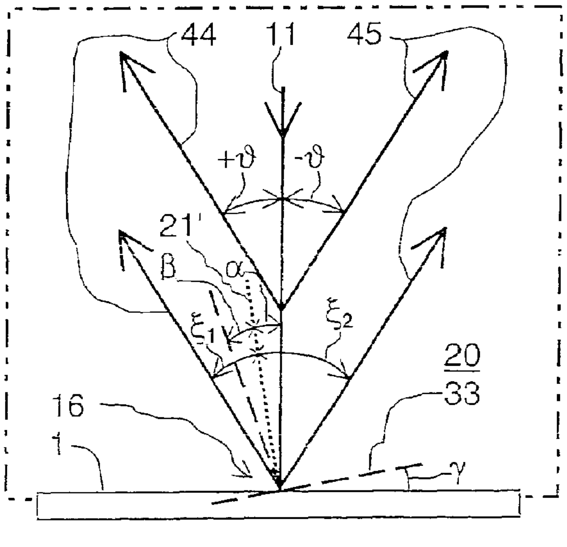
FIG. 9 shows a local angle of inclination of the superimposition function.

FIG. 9 shows the light-diffracting effect of the diffraction structure S(x, y) (FIG. 7) in the diffraction plane 20. The relief structure R(x, y) (FIG. 4) is the diffraction grating 32 (FIG. 4) with a for example sinusoidal profile and a spatial frequency f of less than 2400 lines/mm. The grating vector of the relief structure R(x, y) is in the diffraction plane 20. The superimposition function M(x, y) in the surface portion 13 (FIG. 2), 14 (FIG. 2) and 15 (FIG. 2) of the security feature 16 is determined by the effect of the diffraction structure S(x, y), wherein the light 11 which is incident on the layer composite 1, at a predetermined viewing angle +θ and −θ respectively, is deflected into the positive diffraction order 23 (FIG. 3) or into the negative diffraction order 24 (FIG. 3) respectively. In the diffraction plane 20 first beams 44 of the wavelength $\lambda_1$ include the viewing angle θ with the incident light 11 and second beams 45 of the wavelength $\lambda_2$ include the viewing angle −θ. The observer 35 (FIG. 5) perceives the surface portion 13, 14, 15 at the viewing angle θ in the color of the wavelength $\lambda_1$. After rotation of the layer composite 1 in the plane thereof through 180° the surface portion 13, 14, 15 appears to the observer 35 at the viewing angle −θ in the color of the wavelength $\lambda_2$. If the central surface 33 involves the local inclination γ=0° the wavelengths $\lambda_1$ and $\lambda_2$ do not differ. For other values of the local inclination γ the wavelengths $\lambda_1$ and $\lambda_2$ differ. The normal 21' to the inclined central surface 33, shown in broken line, includes the angle α with the incident beam 11, wherein α=−β=γ. The first beams 44 and the normal 21' include the diffraction angle $\xi_1$, while the second beams 45 and the normal 21' include the diffraction angle $\xi_2$.

Because of $\xi_k=\text{asin}(\sin\alpha+m_k\cdot\lambda_k\cdot f)$ and α=γ, the relationship for the first two diffraction orders 23, 24, that is to say for $m_k=\pm1$, is as follows:

$$f\cdot(\lambda_1+\lambda_2)=2\cdot\sin(\theta)\cdot\cos(\gamma) \quad (1),$$

from which it follows that, for predetermined values of the viewing angle θ and the spatial frequency f, the sum of the two wavelengths $\lambda_1$, $\lambda_2$ of the beams 44, 45 is proportional to the cosine of the local angle of inclination γ. The equation (1) is to be easily derived for other order numbers m. The order numbers m and the viewing angle θ for a given observable color are determined by the spatial frequency f.

Figure 10A:
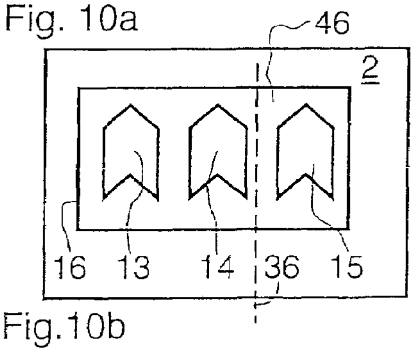
FIG. 10 shows orientation of the security element by means of color contrast in the security feature.
Figure 10B:
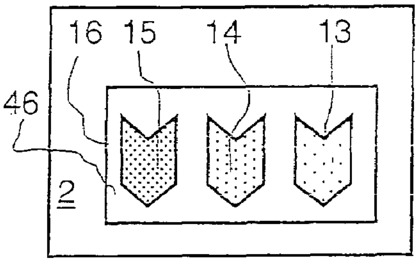

FIGS. 10*a* and 10*b* show by way of example an embodiment of the security feature 16, wherein in FIG. 10*a* the security element 2 is rotated through 180° with respect to the security element 2 in FIG. 10*b*, in the plane thereof. The diffraction plane 20 (FIG. 9) is illustrated by the line 36 thereof. In FIGS. 10*a* and 10*b* the security feature 16 includes the three surface portions 13, 14, 15 with the diffraction structure S(x, y)=R(x, y)+M(x, y), wherein, in the three surface portions 13, 14, 15, the diffraction structures S(x, y) differ by virtue of the values, determined by means of equation (1), in respect of the local inclinations γ of the superimposition function M(x, y) and the spatial frequency f of the relief profiles R(x, y). A background field 46 adjoins at least one surface portion 13, 14, 15 and has the diffraction grating 32 (FIG. 4) with the same relief profile R(x, y) and the spatial frequency f which is specific to the background field 46. The grating vector of the relief profile R(x, y) is oriented in parallel relationship with the line 36 in the surface portions 13, 14, 15 and in the background field 46. Upon perpendicular illumination of the security element 2 with white light 11 (FIG. 9), the surface portions 13, 14, 15 and the background field 46 light in the same color in the security element 16 in the orientation shown in FIG. 10*a*, at the viewing angle +θ, and the security feature 16 appears to light up without contrast in a uniform color for the observer 35 (FIG. 5), for example the deflected first beams 44 (FIG. 9) are of the wavelength $\lambda_1$ for example 680 nm (red). In the orientation shown in FIG. 10*b*, the entire security feature 16 is observed at the viewing angle −θ. For example the first surface portion 13 lights up in the second beams 45 (FIG. 9) of the wavelength $\lambda_2$, for example $\lambda_2$=570 nm (yellow), the second surface portion 14 lights up in the second beams 45 of the wavelength 3, for example $\lambda_3$=510 nm (green) and the third surface portion 15 lights up in the second beams 45 of the wavelength 4, for example $\lambda_4$=400 nm (blue). In the background field 46 in which the central surface 33 (FIG. 9) of the diffraction grating 32 (FIG. 4) involves the inclination γ (FIG. 9) with the value γ=0, for symmetry reasons the second beams 45 are also of the wavelength $\lambda_1$, that is to say, the background surface 46 again emits in the red color. The advantage of this embodiment is the striking optical characteristic of the security feature 16, namely the color contrast which is visible at a single predetermined orientation of the security element 2 and which changes or disappears after a 180° rotation of the security element 2 about the surface normal 21 (FIG. 3). The security feature 16 thus serves to establish a predetermined orientation of the security element 2 with the security feature 16 which cannot be holographically copied.

It is only for the sake of simplicity that a uniform color, that is to say a constant inclination γ, has been assumed to apply by way of example in each surface portion 13, 14, 15. In general terms the surface portion 13, 14, 15 has a portion from the superimposition function M(x, y) so that the inclination γ in the surface portion 13, 14, 15 continuously changes in a predetermined direction and the wavelengths of the second beams 45 originate from a region on both sides of the wavelength $\lambda_k$. Instead of the similarly delimited surface portions 13, 14, 15 a plurality of the surface portions 13, 14, 15 arranged on the background field 46 form a logo, a text and so forth.

Figure 11:
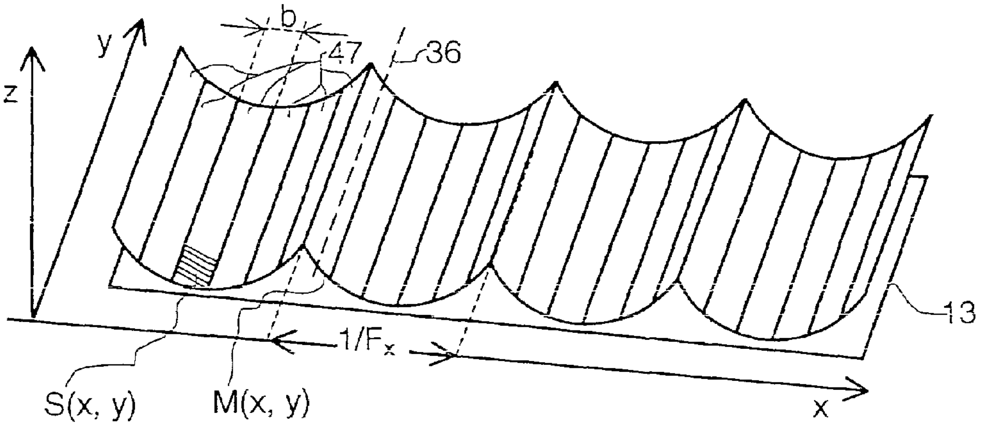
FIG. 11 shows the diffraction structure with a symmetrical superimposition function.

In FIG. 11 the diffraction structure S(x, y) is of a more complicated nature. The superimposition function M(x, y) is a symmetrical, portion-wise steady, periodic function, the value of which varies along the co-ordinate axis x in accordance with z=M(x, y) while M(x, y) is of a constant value z along the co-ordinate axis y. The for example rectangular surface portion 13, 14 (FIG. 10), 15 (FIG. 10) is oriented with its longitudinal side in parallel relationship with the co-ordinate x and is subdivided into narrow partial surfaces 47 of the width b, the longitudinal sides of which are oriented parallel to the co-ordinate axis y. Each period $1/F_x$ of the superimposition structure M(x; y) extends over a number t of the partial surfaces 47, for example the number t is in the range of values of between 5 and 10. The width b should not be less than 10 μm as otherwise the diffraction structure S(x, y) is too little defined on the partial surface 47.

The diffraction structures X(x, y) of the adjacent partial surfaces 47 differ in the summands, the relief profile R(x, y) and the portion of the superimposition function M(x, y), which is associated with the partial surface 47. The relief profile $R_i$(x, y) of the i-th partial surface 47 differs from the two relief profiles $R_{i+1}$(x, y) and $R_{i-1}$(x, y) of the adjacent partial surfaces 47 by at least one grating parameter such as azimuth, spatial frequency, profile height h (FIG. 4) and so forth. If the spatial frequency $F_x$ and $F_y$ respectively are at most 10 lines/mm but not less than 2.5 lines/mm, the observer 35 (FIG. 5) can no longer perceive any subdivision on the surface portion 13, 14, 15 by the periods of the superimposition function M(x, y), with the naked eye. Subdivision and occupation of the partial surfaces 47 with the diffraction structure S(x, y) is repeated in each period of the superimposition function M(x, y). In another embodiment of the security feature 16 the relief profile R(x, y) changes continuously as a function of the phase angle of the periodic superimposition function M(x, y).

The diffraction structures S(x, y) shown in FIG. 11 are used in the embodiment of the security feature 16 shown in FIG. 12, which deploys a novel optical effect upon illumination with white light 11 when the security feature 16 is tilted about the tilt axis 41 parallel to the co-ordinate axis y. The security feature 16 includes the triangular first surface portion 14 which is arranged in the rectangular second surface portion 13. In the first surface portion 14 the diffraction structure S(x, y) is distinguished in that the spatial frequency f of the relief profile R(x, y) changes in the direction of the co-ordinate axis x within each period of the superimposition function M(x, y) stepwise or continuously in a predetermined spatial frequency range δf, wherein the spatial frequency $f_i$ is greater in the i-th partial surface 47 (FIG. 7) than the spatial frequency $f_{i-1}$ in the preceding (i−1)-th partial surface 47. In each period therefore the first partial surface 47 involves the spatial frequency f of the value $f_A$. For the partial surface 47 at the minimum of the period, the spatial frequency $f=f_M$ and for the partial surface 47 at the end of the period, the value of the spatial frequency $f=f_E$, wherein $f_A<f_M<f_E$, wherein $\delta f=f_E-f_A$. In the second surface portion 13 the diffraction structure S(x, y) is distinguished in that the spatial frequency f of the relief profile R(x, y) decreases stepwise or continuously in the direction of the co-ordinate axis x within a period of the superimposition function M(x, y) from the one partial surface 47 to the next. In an embodiment, as an example, the diffraction structure S(x, y)=R(−x, y)+M(−x, y) of the second surface portion 13 is the diffraction structure S(x, y) of the first surface portion 14, which is mirrored at the plane defined by the co-ordinate axes y, z. The grating vectors and the line 36 (FIG. 11) of the diffraction plane 20 (FIG. 9) are oriented in substantially parallel relationship with the tilt axis 41 in both surface portions 13, 14. The gradient 38** is substantially parallel to the plane defined by the co-ordinate axes x and z.

Figure 12A:
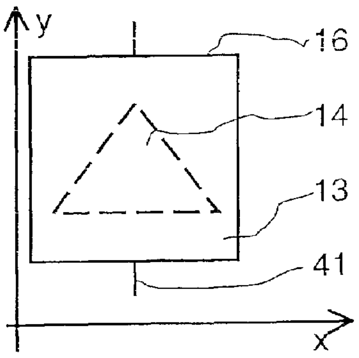
FIG. 12 shows the security feature with color change.

In FIG. 12*a* the security element 16 is in the x-y-plane defined by the coordinate axis x and y, wherein the viewing direction 39 (FIG. 5) forms a right angle with the co-ordinate axis x. In the case of perpendicularly incident white light 11 (FIG. 1) the partial surfaces 47 are illuminated in the region of the minima of the superimposition function M(x, y). As those partial surfaces 47, in both diffraction structures S(x, y), S(x, y), involve the same relief profile R(x, y) and the same inclination γ≈0°, the light beams 34 (FIG. 5) which are diffracted into the viewing direction 39 at the two surface portions 13,14 originate from the same range of the visible spectrum, for example green, so that the color contrast on the security feature 16 disappears between the first surface portion 14 and the second surface portion 13. When the security feature 16 is tilted about the tilt axis 41 the color contrast becomes clearer with an increasing tilt angle, as is shown in FIG. 12***b*. When the security feature is tilted towards the left the color of the first surface portion 14 is displaced in the direction of red as the partial surfaces 47 (FIG. 11) with the relief profiles R(x, y) in respect of which the spatial frequency f is less than $f_M$ become effective. The color of the second surface portion 13 is displaced in the direction of blue as the partial surfaces 47 in respect of which the spatial frequency f of the relief profile R(x, y) is greater than $f_M$ become effective. In FIG. 12*c* the security feature 16 is tilted from the position shown in FIG. 12*a* towards the right about the tilt axis 41. The color contrast also appears markedly upon tilting towards the right, but with interchanged colors. The color of the first surface portion 14 is displaced in the direction of blue as the partial surfaces 47 in respect of which the spatial frequency f of the relief profile R(x, y) is greater than the value $f_M$ become effective while the color of the second surface portion 13 is displaced in the direction of red as the partial surfaces 47 (FIG. 11) in respect of which the spatial frequency f of the relief profile R(x, y) of the diffraction structure S**(x, y) decreases with respect to the value $f_M$ become effective.

In another embodiment of the diffraction structure S(x, y) in FIG. 11 the relief profile R(x, y) in the partial surfaces 47 of each period $1/F_x$ involves the same spatial frequency but the relief profile R(x, y) differs from one partial surface 47 to another by virtue of its azimuth angle φ of the grating vector relative to the co-ordinate axis y. Within a period $1/F_x$ the azimuth angle φ changes stepwise or continuously for example in the range δφ=±40° with φ≈0° in the minimum of each period. The azimuth angle φ is selected in dependence on the local inclination γ (FIG. 5) of the central surface 33 (FIG. 5) from the range δφ in such a way that on the one hand the diffraction structure S(x, y) of the first surface portion 14 (FIG. 12*a*) at all tilt angles about the tilt axis 41 (FIGS. 12*b* and 12*c*), emits diffracted light beams 34 (FIG. 5) of the color range which is predetermined by means of the spatial frequency f, for example from the green range, in the viewing direction 39 (FIG. 5), and on the other hand the second surface portion 13 (12*a*) in which the mirrored diffraction structure S(x, y) is shaped lights up only at a single predetermined tilt angle in the predetermined color, for example in a mixed color produced from the green range. At other tilt angles the second surface portion 13** is dark gray. For the azimuth angle range δφ±20° which is set forth here by way of example, the green range extends from the wavelength λ=530 nm (φ≈0°) to the wavelength λ=564 nm.

Figure 12B:
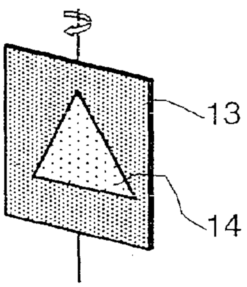
Figure 12C:
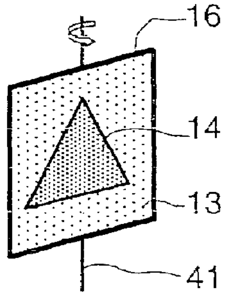
Figure 13:
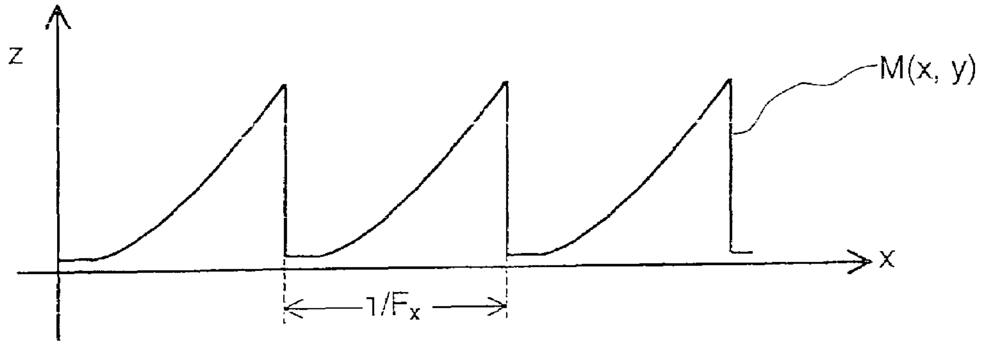
FIG. 13 shows an asymmetrical superimposition function.

In FIG. 13 the superimposition function M(x, y) used in the diffraction structure S(x, y) is an asymmetrical function in the direction of the co-ordinate axis x. The superimposition function M(x, y) rises within the period $1/F_x$ aperiodically from a minimum value to a maximum value, for example like the function $y=\text{const}\cdot x^{1.5}$. The spatial frequency $F_x$ and $F_y$ respectively is in the range of 2.5 lines/mm up to and including 10 lines/mm. Not shown herein are the discontinuity locations which occur due to the operation modulo value H (FIG. 7). The above-described 'anisotropic' matt structure with the preferred direction substantially parallel to the co-ordinate axis x is used as the relief profile R(x, y). The incident light 11 (FIG. 5) is therefore scattered fanned out primarily parallel to the co-ordinate axis y. The diffraction structure S(x, y)=R(x, y)+M(x, y) is shaped in the first surface portion 14 (FIG. 12*a*) and the diffraction structure S(x, y)=R(−x, y)+M(−x, y) is shaped in the second surface portion 13 (FIG. 12***a*). The optical effect of the security element 16 will be described with reference to FIG. 12*a*, with light 11 (FIG. 9) incident on the x-y-plane. When the security element 16 is in the x-y-plane, the incident light 11 of great intensity is scattered by the matt structure in the region of the minima of the superimposition function M(x, y), while the scatter effect of the other surface portions 47 of the diffraction structures S(x, y), S(x, y) is to be disregarded. The light which is backscattered by the surface portions 13, 14 involves the color of the incident light 11 (FIG. 5) and is of the same surface brightness in both surface portions 13, 14 so that it is not possible to see any contrast between the two surface portions 13, 14. In FIG. 12***b* the incident light 11 (FIG. 5) is incident at an angle of incidence α on the security element 16 which is tilted about the tilt axis 41 towards the left. The incident light 11 (FIG. 5) is only still scattered in the second surface portion 13. Under that illumination condition, the surface brightness of the first surface portion 14 is orders of magnitude less than in the second surface portion 13 so that the first surface portion 14 stands out as a dark surface against the light second surface portion 13. In FIG. 12*c* the security feature 16 is tilted away towards the right, in which case now the surface brightnesses of the two surface portions 13 and 14 are interchanged.

In FIGS. 12*a* through 12*c*, instead of a single triangular first surface portion 14, it would be possible to arrange on the second surface portion 13 a plurality of the first surface portions 14 which form a logo, a text and so forth.

A further embodiment, instead of the simple mathematical functions, also uses relief images as are employed on coins and medals, as an at least portion-wise steady superimposition function M(x, y) in the diffraction structure S(x, y), wherein the relief profile R(x, y) is advantageously an 'isotropic' matt structure. In this embodiment the observer of the security element 2 has the impression of a three-dimensional image with a characteristic surface structure. When the security element 2 is rotated and tilted the distribution of brightness in the image changes according to the expectation in relation to a true relief image, but projecting elements do not cast any shadow.

Without departing from the idea of the invention, all diffraction structures S are restricted in respect of their structure height to the value $H_{St}$ (FIG. 1), as was described with reference to FIG. 7. The relief profiles R(x, y) and superimposition functions M(x, y) used in the above-described specific embodiments can be combined as desired to afford other diffraction structures S(x, y).

The use of the above-described security features 16 in the security element 2 has the advantage that the security feature 16 forms an effective barrier against attempts to holographically copy the security element 2. In a holographic copy the positional displacements or color shifts on the surface of the security element 16 are only to be perceived in an altered form.

What is claimed is:

1. A security element comprising:

a layer composite including a surface pattern with microscopically fine optically effective structures embedded between transparent layers of the layer composite, wherein the optically effective structures are shaped into a reflecting interface in surface portions of a security feature in a plane of the surface pattern, which plane is defined by co-ordinate axes (x; y), wherein at least one of the surface portions having a dimension greater than 0.4 mm comprises a diffraction structure, the diffraction structure formed by additive or subtractive superimposition of a superimposition function (M) and a microscopically fine relief profile (R) that follows along the superimposition function (M), wherein the superimposition function (M), the relief profile (R) and the diffraction structure are functions of the co-ordinate axes (x; y);

the relief profile (R) defined by a light-diffracting or light-scattering, optically effective structure which is unchanged in a region of the superimposition function (M); and the superimposition function (M) defined by a macroscopic structure, wherein a central surface defined by the superimposition function (M) is curved at least in partial regions and at any point has an angle of inclination predetermined by a gradient of the superimposition function (M), wherein the superimposition function (M) is not a periodic triangular or rectangular function and wherein the superimposition function (M) varies less than the relief profile (R) at least in the partial regions.

2. A security element as set forth in claim 1, wherein the superimposition function (M) in the at least one surface portion is a steady, periodic function with a spatial frequency of at most 20 lines/mm.

3. A security element as set forth in claim 2, wherein the relief profile (R) is a diffraction grating of constant profile height, which has a grating vector with an azimuth angle and with a spatial frequency of greater than 300 lines/mm.

4. A security element as set forth in claim 3, wherein the security feature has at least two adjacent surface portions and wherein a first diffraction structure is shaped in a first surface portion and a second diffraction structure which differs from the first diffraction structure is shaped in a second surface portion, wherein the grating vector or the preferred direction of a first relief profile (R) in the first surface portion and the grating vector or the preferred direction of a second relief profile (R) in the second surface portion are directed substantially parallel.

5. A security element as set forth in claim 3, wherein in the diffraction structure the grating vector or the preferred direction of the relief profile (R) is substantially parallel to a gradient plane which is determined by the gradient of the superimposition function (M) and a surface normal which is perpendicular to the surface of the layer composite.

6. A security element as set forth in claim 3, wherein shaped in a first surface portion is a first diffraction structure which is formed as the sum of the relief profile (R) and the superimposition function (M) and wherein shaped in a second surface portion is a second diffraction structure which is formed as the difference (R–M) of the same relief profile (R) and the same superimposition function (M).

7. A security element as set forth in claim 3, wherein in the diffraction structure the grating vector or the preferred direction of the relief profile (R) is substantially perpendicular to a gradient plane which is determined by the gradient of the superimposition function (M) and a surface normal which is perpendicular to the surface of the layer composite.

8. A security element as set forth in claim 3, wherein in a first surface portion a first diffraction structure is formed from the sum of the relief profile (R) and the superimposition function (M) and wherein in a second surface portion a second diffraction structure is formed from the first diffraction structure (S).

9. A security element as set forth in claim 3, wherein the diffraction structure formed as the sum of the superimposition function (M) and the relief profile (R) is shaped in at least one surface portion, wherein the spatial frequency of the relief profile (R) is less than 2400 lines/mm and the superimposition function (M) has an inclination ($\gamma$) measured in the diffraction plane of the relief profile (R), wherein the surface portion adjoins a background field of the security feature, wherein the background field parallel to a cover layer has the central surface with the inclination $\gamma=0°$ into which a sinusoidal diffraction grating with a second spatial frequency and with a grating vector oriented in parallel in the diffraction plane of the relief profile (R) is shaped, wherein the second spatial frequency is so selected that upon perpendicular illumination with white light in one viewing direction at a predetermined positive viewing angle the surface portion and the background field do not differ with respect to the color of the diffracted light and wherein after a 180° rotation of the layer composite about the surface normal at the negative viewing angle the surface portion and the background field differ with respect to the color of the diffracted light.

10. A security element as set forth in claim 2, wherein the relief profile (R) is an anisotropic matt structure which has a preferred direction with an azimuth angle.

11. A security element as set forth in claim 1, wherein the superimposition function (M) in the at least one surface portion is an asymmetrical, steady, periodic function with a spatial frequency in the range of between 2.5 lines/mm and 10 lines/mm.

12. A security element as set forth in claim 11, wherein the relief profile (R) is a diffraction grating which has a grating vector with an azimuth angle and a spatial frequency greater than 300 lines/mm, wherein the surface portion in each of a plurality of periods (1/F) of the superimposition function (M) is subdivided into a number t of partial surfaces of the width $1/(F \cdot t)$, wherein F is a spatial frequency of the superimposition function (M), wherein a first diffraction grating of the diffraction structure, which is associated with the one partial surface, differs in at least one of the grating parameters from a second diffraction gratings of the adjacent partial surfaces, wherein the subdivision and the occupation of the partial surfaces with the diffraction structure is repeated in each period (1/F) of the superimposition function (M) and wherein the diffraction grating has the azimuth angle and/or the spatial frequency corresponding to an inclination in the surface portion and wherein within each period (1/F) the grating parameters of the diffraction grating step-wise or continuously traverse a predetermined azimuth angle range or a predetermined spatial frequency range respectively.

13. A security element as set forth in claim 1, wherein adjacent extreme values of the superimposition function (M) in the surface portion are remote from each other by at least 0.025 mm.

14. A security element as set forth in claim 1, wherein the relief profile (R) is an isotropic matt structure.

15. A security element as set forth in claim 14, wherein the superimposition function (M) describes a relief image.

16. A security element as set forth in claim 14, wherein the superimposition function (M) describes a portion of a sphere.

17. A security element as set forth in claim 1, wherein the diffraction structure is restricted to a structure height of less than 40 μm and the superimposition function (M) is restricted to a variation value (H) of less than 30 μm, wherein the value of the superimposition function (M), which is used in the diffraction structure is equal to $\{(M)+C(x; y)\}$ modulo variation value $(H)-C(x; y)$, wherein the function $C(x; y)$ is restricted in amount to half the structure height.

18. A security element as set forth in claim 1, wherein surface elements having optically effective structures are parts of the surface pattern and at least one of the structure elements adjoins the security feature.

19. A security element as set forth in claim 1, wherein arranged on at least one of the surface portions is at least one identification mark with another optically effective structure differing from the diffraction structure, wherein that identification mark which can be used as a reference for orientation of the layer composite comprises at least one of a diffractive relief structure, a light-scattering relief structure and a mirror surface.

20. A security element as set forth in claim 1, wherein the additive or subtractive superimposition forms a single surface relief.

* * * * *